(12) United States Patent
Sohn et al.

(10) Patent No.: US 11,390,053 B2
(45) Date of Patent: Jul. 19, 2022

(54) SUPPORTING FRAME AND DISPLAY DEVICE INCLUDING THE SAME

(71) Applicant: LG DISPLAY CO., LTD., Seoul (KR)

(72) Inventors: A-Ram Sohn, Seoul (KR); Jae-Chul Hwang, Paju-si (KR); Won-Bong Jang, Seoul (KR); Hye-Ran Park, Goyang-si (KR)

(73) Assignee: LG DISPLAY CO., LTD., Seoul (KR)

( * ) Notice: Subject to any disclaimer, the term of this patent is extended or adjusted under 35 U.S.C. 154(b) by 68 days.

(21) Appl. No.: 15/722,338

(22) Filed: Oct. 2, 2017

(65) Prior Publication Data
US 2018/0117876 A1    May 3, 2018

(30) Foreign Application Priority Data
Oct. 31, 2016    (KR) .................. 10-2016-0143281

(51) Int. Cl.
*B32B 7/12*    (2006.01)
*C09J 5/06*    (2006.01)
*G02F 1/1333*    (2006.01)

(52) U.S. Cl.
CPC ................................ *B32B 7/12* (2013.01); *C09J 5/06* (2013.01); *G02F 1/133308* (2013.01); *C09J 2463/006* (2013.01); *G02F 1/133314* (2021.01); *G02F 1/133317* (2021.01); *G02F 2202/28* (2013.01)

(58) Field of Classification Search
CPC ......... B32B 7/12; C09J 5/06; C09J 2463/006; G02F 1/133308; G02F 1/133314; G02F 1/133317; G02F 2202/28; G02F 1/133331; G02F 1/133328; H01L 51/524
See application file for complete search history.

(56) References Cited

U.S. PATENT DOCUMENTS

| 6,773,535 B1 | 8/2004 | Wetzel | |
| 9,411,421 B2* | 8/2016 | Tamura | G02F 1/13338 |
| 2008/0151503 A1 | 6/2008 | Aapro et al. | |
| 2008/0298001 A1* | 12/2008 | Choi | G02F 1/133308 |
| | | | 361/679.02 |
| 2013/0021780 A1* | 1/2013 | Jung | G02B 6/0088 |
| | | | 362/97.1 |
| 2013/0141345 A1* | 6/2013 | Wang | G06F 1/1626 |
| | | | 345/173 |
| 2013/0155354 A1* | 6/2013 | Wang | G02F 1/133512 |
| | | | 349/106 |
| 2014/0293574 A1* | 10/2014 | Hwang | G02B 5/3083 |
| | | | 362/19 |

(Continued)

FOREIGN PATENT DOCUMENTS

| CN | 201096310 Y | 8/2008 |
| CN | 100531531 C | 8/2009 |
| CN | 101629056 A | 1/2010 |

(Continued)

*Primary Examiner* — Michael H Caley
*Assistant Examiner* — Agnes Dobrowolski
(74) *Attorney, Agent, or Firm* — Birch, Stewart, Kolasch & Birch, LLP

(57) ABSTRACT

A display device in one example includes a display panel, a supporting frame supporting the display panel, and an adhesive between the display panel and the supporting frame. The supporting frame includes a case, and a thermal shape changing part constituting a portion of the case. The thermal shape changing part includes a shape memory material.

10 Claims, 14 Drawing Sheets

(56) References Cited

U.S. PATENT DOCUMENTS

2017/0205654 A1* 7/2017 Iwaki ................ G02F 1/133308

FOREIGN PATENT DOCUMENTS

| | | |
|---|---|---|
| CN | 101755451 A | 6/2010 |
| CN | 102458801 A | 5/2012 |
| CN | 102998825 A | 3/2013 |
| CN | 103153013 A | 6/2013 |
| CN | 103998549 A | 8/2014 |
| CN | 105121574 A | 12/2015 |
| JP | 60-50513 A | 3/1985 |
| JP | 2003-21834 A | 1/2003 |
| JP | 2006-106417 A | 4/2006 |
| TW | I503505 B | 10/2015 |
| TW | I537782 B | 6/2016 |
| TW | I552123 B | 10/2016 |
| WO | WO 2016/046972 A1 | 3/2016 |

* cited by examiner

SUPPORTING FRAME AND DISPLAY DEVICE INCLUDING THE SAME

CROSS-REFERENCE TO RELATED APPLICATIONS

This application claims the priority benefit under 35 U.S.C. § 119(a) of Korean Patent Application No. 10-2016-0143281, filed on Oct. 31, 2016, in the Korean Intellectual Property Office, which is incorporated herein by reference in its entirety into the present application.

BACKGROUND

1. Technical Field

The present disclosure relates to a display device, and more particularly, to a supporting frame attached to an element by an adhesive while rework process is performed, and to a display device including the supporting frame.

2. Discussion of the Related Art

As an information society progresses, a display device has been developed. As a result, flat panel display (FPD) devices having a thin profile, a light weight and a low power consumption such as a liquid crystal display (LCD) device and a light emitting diode display device have been the subject of recent research.

Among the FPD devices, an LCD device having an advantage in displaying a moving image and a high contrast ratio has been widely used for a television and a monitor. The LCD device displays an image using an optical anisotropy and a polarization property of a liquid crystal molecule.

The LCD device includes a liquid crystal panel having two substrates and a liquid crystal layer between the two substrates and a backlight unit under the liquid crystal panel. An alignment direction of the liquid crystal molecule is changed by an electric field in the liquid crystal panel and an image is displayed due to a transmittance difference with respect to a light from the backlight unit.

The LCD device includes a supporting frame which surrounds the backlight unit and supports the liquid crystal panel. The supporting frame may be referred to as a main frame or a bottom frame.

FIG. 1 is a cross-sectional view showing a liquid crystal display device according to the related art.

In FIG. 1, a liquid crystal display (LCD) device 1 includes a liquid crystal panel 10, a backlight unit 20 under the liquid crystal panel 10, a supporting frame 30 surrounding the backlight unit 20 and supporting the liquid crystal panel 10, and an adhesive 40 attaching the supporting frame 30 and the liquid crystal panel 10 to each other.

The liquid crystal panel 10 includes first and second substrates 12 and 14 facing each other and a liquid crystal layer between the first and second substrates 12 and 14, and the backlight unit 20 includes a light source.

However, after the liquid crystal panel 10 and the supporting frame 30 are attached to each other using the adhesive 40, a defect may occur in the attachment state and a rework process may be required. When the defect occurs, the liquid crystal panel 10 is separated from the supporting frame 30, the defect is cured, and the supporting frame 30 and the liquid crystal panel 10 are re-attached to each other.

According to the related art, since the adhesive 40 does not get clearly peeled off from an interface of the liquid crystal panel 10 or an interface of the supporting frame 30, the process of removing the adhesive 40 can be difficult and is performed for both of the liquid crystal panel 10 and the supporting frame 30. As a result, the rework process has a problem in the peeling operation of the adhesive 40 for the rework process.

SUMMARY

Embodiments of the present disclosure relate to a supporting frame where an adhesive is clearly and completely removed and a display device including the supporting frame.

One or more embodiments of the present disclosure relate to a display device where a rework property is improved with increase of a cost and reduction of a mechanical property of a supporting frame minimized by replacing a portion of a side surface of the supporting frame with a thermal shape changing part of a shape memory material.

Advantages and features of the disclosure will be set forth in part in the description, which follows and in part will become apparent to those having ordinary skill in the art upon examination of the following or may be learned from practice of the disclosure. Other advantages and features of the embodiments herein may be realized and attained by the structure particularly pointed out in the written description and claims hereof as well as the appended drawings.

It is to be understood that both the foregoing general description and the following detailed description are explanatory, and are intended to provide further explanation of the embodiments as claimed.

BRIEF DESCRIPTION OF THE DRAWINGS

The accompanying drawings, which are included to provide a further understanding of the disclosure, are incorporated in and constitute a part of this specification, illustrate implementations of the disclosure and together with the description serve to explain the principles of embodiments of the disclosure.

DETAILED DESCRIPTION OF THE EMBODIMENTS

Figure 1:
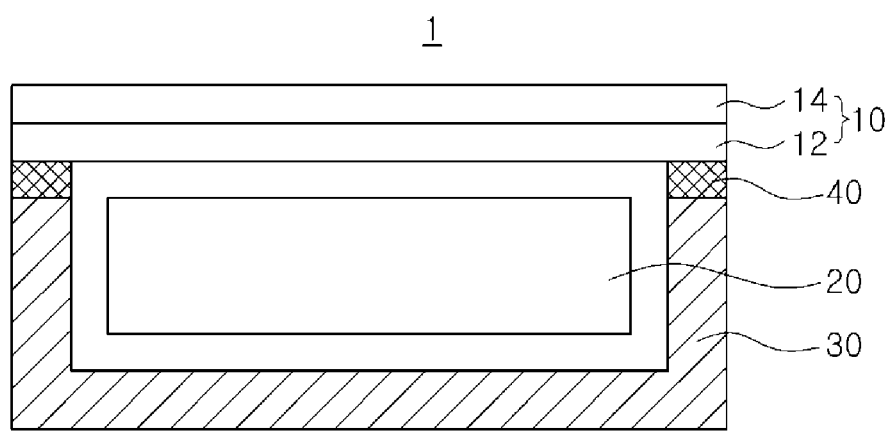
FIG. 1 is a cross-sectional view showing a liquid crystal display device according to the related art.

Reference will now be made in detail to embodiments of the present disclosure, examples of which are illustrated in the accompanying drawings. In the following description, when a detailed description of well-known functions or configurations related to this document is determined to unnecessarily cloud a gist of an embodiment of the disclosure, the detailed description thereof will be omitted. The progression of processing steps and/or operations described is an example; however, the sequence of steps and/or operations is not limited to that set forth herein and may be changed as is known in the art, with the exception of steps and/or operations necessarily occurring in a certain order. Like reference numerals designate like elements throughout. Names of the respective elements used in the following explanations are selected only for convenience of writing the specification and may be thus different from those used in actual products.

FIGS. 2A to 2F are perspective views showing various examples of a supporting frame according to a first embodiment of the present disclosure. The supporting frame according to all embodiments of the present disclosure can be used preferably for various types of display devices such as an LCD device. All the components of the supporting frame according to all embodiments of the present disclosure are operatively coupled and configured.

Figure 2A:
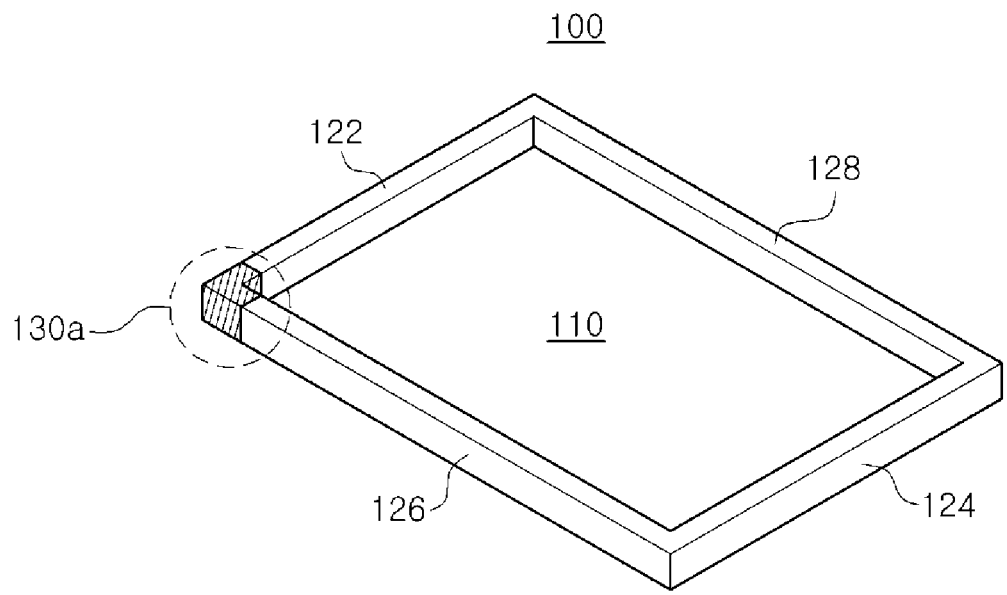
FIGS. 2A to 2F are perspective views showing examples of a supporting frame according to a first embodiment of the present disclosure.

In FIG. 2A, a supporting frame 100 according to the first embodiment of the present disclosure includes a bottom surface 110, first to fourth side surfaces 122, 124, 126 and 128 upwardly protruding from the bottom surface 110, and a thermal shape changing part 130a at a corner where the first and third side surfaces 122 and 126 cross each other. The thermal shape changing part 130a may include a shape memory material.

The first and second side surfaces 122 and 124 face each other, and the third and fourth side surfaces 126 and 128 face each other between the first and second side surfaces 122 and 124.

The thermal shape changing part 130a may be disposed at the corner of adjacent two of the first to fourth side surfaces 122, 124, 126 and 128. Although the thermal shape changing part 130a is disposed at the corner between the first and third side surfaces 122 and 126 in FIG. 2A, a position of the thermal shape changing part 130a is not limited. For example, the thermal shape changing part 130a may be disposed at the corner between the second and third side surfaces 124 and 126.

The bottom surface 110 and the first to fourth side surfaces 122, 124, 126 and 128 may include one of a metal such as aluminum (Al), stainless steel (SUS) and electro galvanized iron (EGI), a plastic such as polycarbonate (PC) and a carbon fiber reinforced plastic, and a glass.

The thermal shape changing part 130a may include a shape memory material such as a nickel titanium (Ni—Ti) alloy, a copper zinc nickel (Cu—Zn—Ni) alloy, a copper aluminum nickel (Cu—Al—Ni) alloy, a silver nickel (Ag—Ni) alloy and a gold cadmium (Au—Cd) alloy. As a result, a portion of the side surfaces of the supporting frame 100 may include a shape memory material.

Figure 2B:
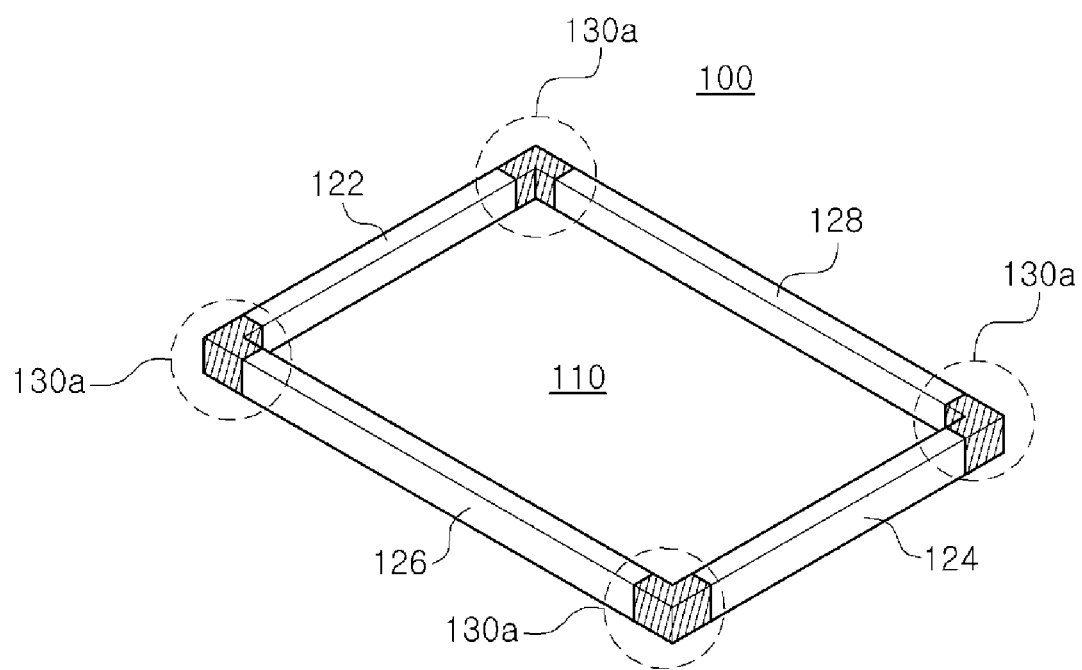

In FIG. 2B, the thermal shape changing part 130a may be disposed at all of the four corners of the supporting frame 100. The thermal shape changing part 130a is disposed at each of a first corner between the first and third side surfaces 122 and 126, a second corner between the first and fourth side surfaces 122 and 128, a third corner between the second and third side surfaces 124 and 126, and a fourth corner between the second and fourth side surfaces 124 and 128.

In another embodiment, the thermal shape changing part 130a may be disposed at two or three of the first to fourth corners.

In FIGS. 2A and 2B, a length of the thermal shape changing part 130a is smaller than a length of each of the first to fourth side surfaces 122, 124, 126 and 128. A thickness of the thermal shape changing part 130a is the same as a thickness of each of the first to fourth side surfaces 122, 124, 126 and 128.

Figure 2C:
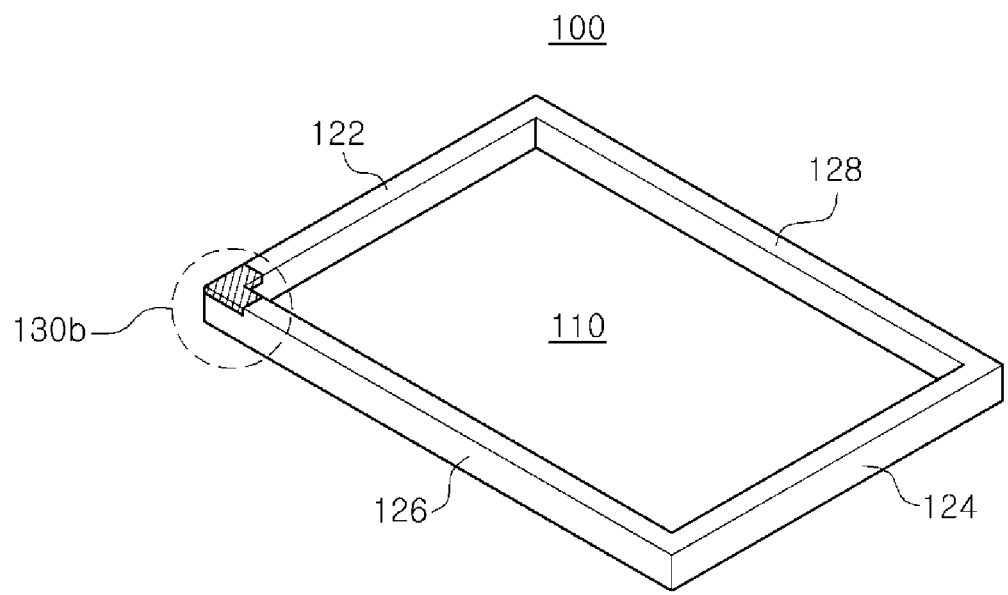

In FIG. 2C, a thermal shape changing part 130b of a shape memory material may be disposed at an upper portion of the corner between the first and third side surfaces 122 and 126 of the supporting frame 100. While a thickness (height) of the thermal shape changing part 130a is the same as a thickness (height) of the first side surface 122 in FIG. 2A, a thickness (height) of the thermal shape changing part 130b is smaller than a thickness (height) of the first side surface 122 in FIG. 2C.

Figure 2D:
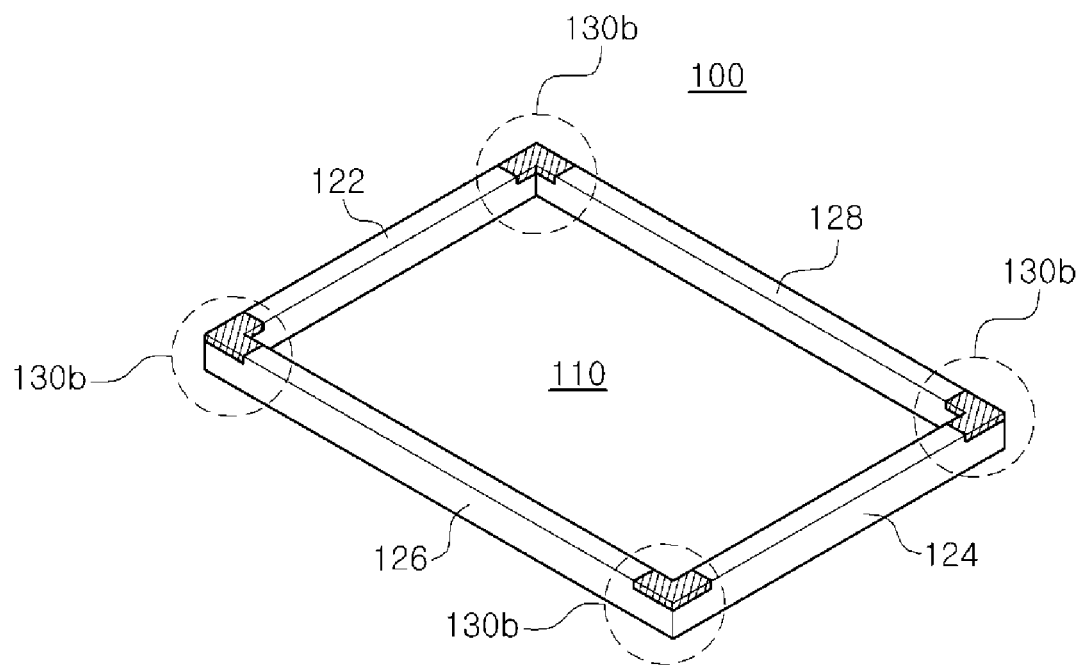

In FIG. 2D, the thermal shape changing part 130b may be disposed at upper portions of all of the four corners of the supporting frame 100. The thermal shape changing part 130b is disposed at each of a first corner between the first and third side surfaces 122 and 126, a second corner between the first and fourth side surfaces 122 and 128, a third corner between the second and third side surfaces 124 and 126, and a fourth corner between the second and fourth side surfaces 124 and 128.

In another embodiment, the thermal shape changing part 130b may be disposed at two or three of the first to fourth corners.

In FIGS. 2C and 2D, a length of the thermal shape changing part 130b is smaller than a length of each of the first to fourth side surfaces 122, 124, 126 and 128. A thickness of the thermal shape changing part 130b is smaller than a thickness of each of the first to fourth side surfaces 122, 124, 126 and 128.

Figure 2E:
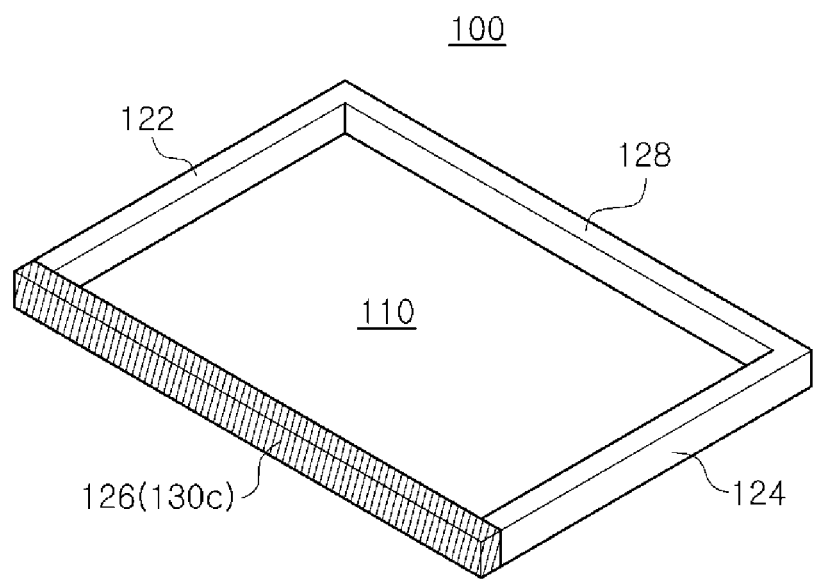
Figure 2F:
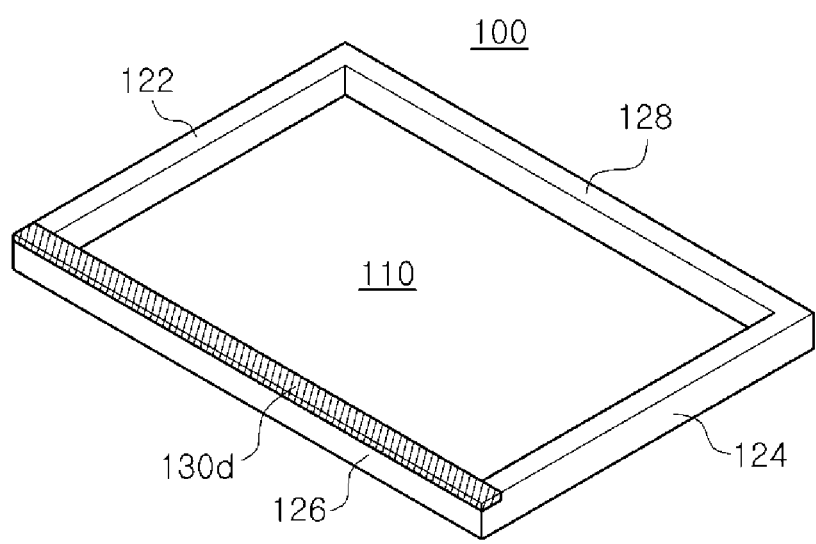

The third side surface 126 may constitute a thermal shape changing part 130c in FIG. 2E, and an upper portion of the third side surface 126 may constitute a thermal shape changing part 130d in FIG. 2F.

A length of the thermal shape changing part 130c and 130d is the same as a length of the third side surface 126.

In another embodiment, a thermal shape changing part 130 may be disposed at a central portion of one side surface (e.g., the third side surface 126).

The thermal shape changing part 130a and 130b may constitute a flat top surface with the first to fourth side surfaces 122, 124, 126 and 128 of the supporting frame 100. As a result, an adhesive may be formed to have a uniform thickness.

The supporting frame 100 may include a case having the bottom surface 110 and the first to fourth side surfaces 122, 124, 126 and 128, and the thermal shape changing part 130 constituting a portion of the case.

The first to fourth side surfaces 122, 124, 126 and 128 of the supporting frame 100 contact the adhesive and include the thermal shape changing part 130 of a shape memory material at a portion thereof. As a result, the supporting frame 100 includes the thermal shape changing part 412 at a portion thereof, the supporting frame 100 and the adhesive contact each other with a first contact area, and the thermal shape changing part 130 and the adhesive contact each other with a second contact area smaller than the first contact area.

Figure 3:
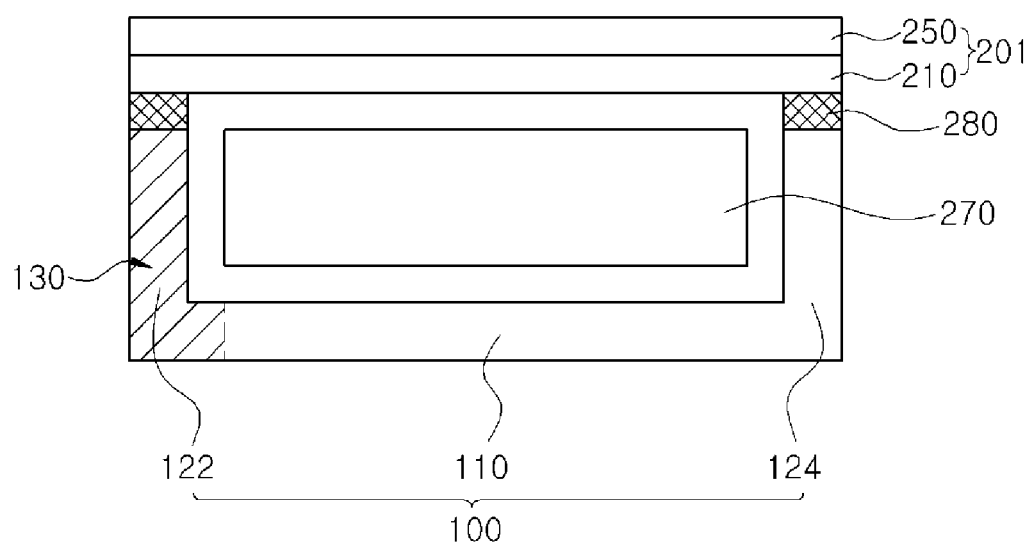
FIG. 3 is a cross-sectional view showing a display device according to a second embodiment of the present disclosure.
Figure 4:
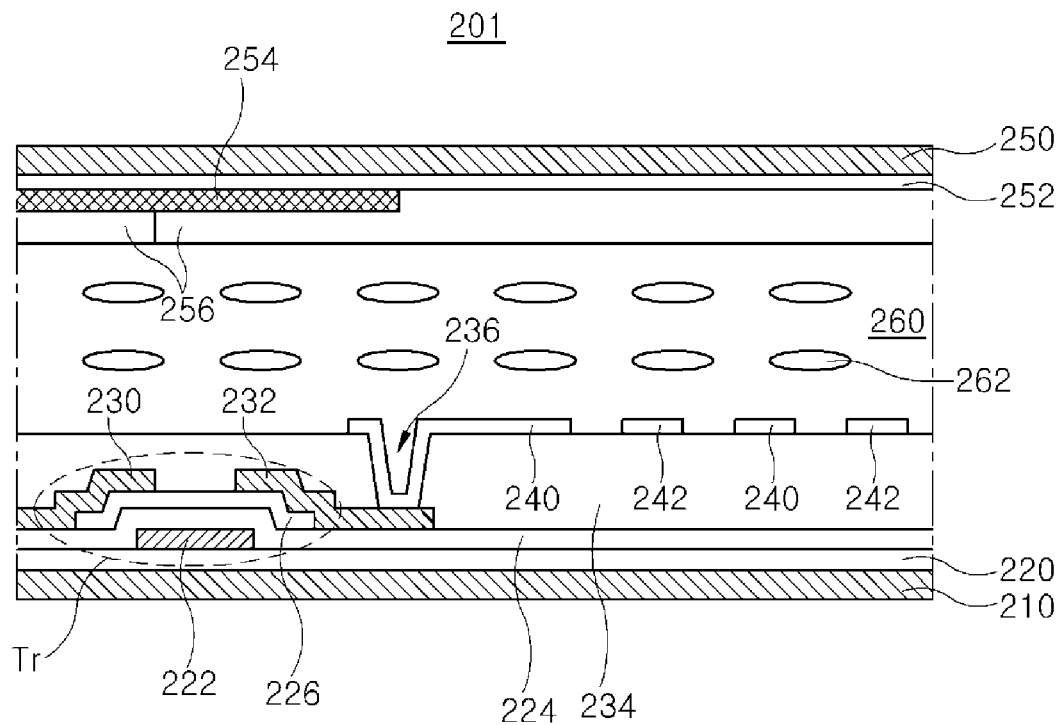
FIG. 4 is a cross-sectional view showing a display panel of a display device according to the second embodiment of the present disclosure.

FIG. 3 is a cross-sectional view showing a display device according to a second embodiment of the present disclosure, and FIG. 4 is a cross-sectional view showing a display panel of a display device according to the second embodiment of the present disclosure. All the components of the display device according to all embodiments of the present disclosure are operatively coupled and configured.

In FIG. 3, a display device 200 according to a second embodiment of the present disclosure includes a display panel 201, a backlight unit 270 under the display panel 201, a supporting frame 100 surrounding the backlight unit 270 and supporting the display panel 201, and an adhesive 280 attaching the supporting frame 100 and the display panel 201 to each other.

The display panel 201 includes first and second substrates 210 and 250 facing each other and a liquid crystal layer between the first and second substrates 210 and 250, and the backlight unit 201 includes a light source. The display pane 201 of the second embodiment is a liquid crystal panel, and the display device 200 of the second embodiment is a liquid crystal display (LCD) device.

In FIG. 4, the display panel 201 includes first and second substrates 210 and 250 facing each other and a liquid crystal layer 260 having a liquid crystal molecule 262 between the first and second substrates 210 and 250. The display panel having the first and second substrates 210 and 250 obviously includes various elements (e.g., plurality of pixels, etc.) for displaying images.

A first buffer layer 220 is formed on an inner surface of the first substrate 210, and a thin film transistor (TFT) Tr is formed on the first buffer layer 220. The first buffer layer 220 may be omitted in another embodiment.

A gate electrode 222 is formed on the first buffer layer 220, and a gate insulating layer 224 is formed on the gate electrode 222. A gate line connected to the gate electrode 222 is formed on the first buffer layer 220.

A semiconductor layer 226 is formed on the gate insulating layer 224 corresponding to the gate electrode 222. The semiconductor layer 226 may include an oxide semiconductor material. Alternatively, the semiconductor layer 226 may include an active layer of amorphous silicon and an ohmic contact layer of impurity-doped amorphous silicon.

A source electrode 230 and a drain electrode 232 spaced apart from each other are formed on the semiconductor layer 226. A data line connected to the source electrode 230 is formed on the gate insulating layer 224. The data line crosses the gate line to define a pixel region. The gate electrode 222, the semiconductor layer 226, the source electrode 230 and the drain electrode 232 constitute a thin film transistor (TFT) Tr.

A passivation layer 234 is formed on the TFT Tr. The passivation layer 234 has a drain contact hole 236 exposing the drain electrode 232. A pixel electrode 240 and a common electrode 242 are formed on the passivation layer 234. The pixel electrode 240 is connected to the drain electrode 232 through the drain contact hole 236, and the pixel electrode 242 is alternately disposed with the pixel electrode 240.

A second buffer layer 252 is formed on an inner surface of the second substrate 250, and a black matrix covering a non-display area of the TFT Tr, the gate line and the data line is formed on the second buffer layer 252. In addition, a color filter layer 256 is formed on the black matrix 256 and the second buffer layer 252 corresponding to the pixel region. The second buffer layer 252 and the black matrix 254 may be omitted.

The first and second substrates 210 and 250 may be attached with the liquid crystal layer 260 interposed therebetween. The liquid crystal molecule of the liquid crystal layer 260 is driven by an electric field generated between the pixel electrode 240 and the common electrode 242.

Further, an alignment layer may be formed on each of the inner surfaces of first and second substrates 210 and 250, and a polarizing plate may formed on each of outer surfaces of the first and second substrates 210 and 250. Transmission axes of the polarizing plates may be perpendicular to each other.

In FIG. 3, the backlight unit 270 is disposed under the display panel 201 and supplies a light to the display panel 201. For example, the backlight unit 270 may include a light guide plate under the display panel 201, a light source at one side of the light guide plate, a reflecting plate on a rear surface of the light guide plate, and an optical sheet between the light guide plate and the display panel 201.

The supporting frame 100 includes the bottom surface 110 and the first and second side surfaces 122 and 124. The bottom surface 110 covers a rear surface of the backlight unit 270. The first and second side surfaces 122 and 124 cover side surfaces of the backlight unit 270 and support the display panel 201.

A portion of the first side surface 122 may constitute the thermal shape changing part 130 of a shape memory material. For example, the thermal shape changing part 130 may be disposed at the corner between the first and third side surfaces 122 and 126 as shown in FIG. 2A.

An adhesive 280 is disposed between the display panel 201 and each of the first and second side surfaces 122 and 124 and the thermal shape changing part 130 to attach the display panel 201 to the supporting frame 100. Since the thermal shape changing part 130 is formed at a portion of the supporting frame 100, a contact area of the thermal shape changing part 130 and the adhesive 280 is smaller than a contact area of the supporting frame 100 and the adhesive.

The adhesive 280 may include an elastic resin. The adhesive 280 may include at least one of an acrylic compound, an urethane compound, a silicon compound and an epoxy compound. In addition, the adhesive 280 may further include a black particle for preventing a light leakage.

For example, the adhesive 280 may include an urethane compound (e.g., diphenylmethane diisocyanate (MDI), urethane prepolymer), an acrylic compound for UV cure (e.g., N-acryloyl morpholine (ACMO), isobornyl acrylate (IBOA), 2-phenoxyethyl acrylate, tetraethyleneglycol diacrylate), a black particle such as a carbon black and a titanium black, a fumed silica for forming a shape of the adhesive 280. The adhesive 280 further includes a coupling agent for improving an adhesive force and a dehydrating agent for improving a stability of storage.

When the display device 200 has a defect, the adhesive 280 is peeled and then a rework process is performed. The peeling process of the adhesive 280 is performed by a heating.

Figure 5:
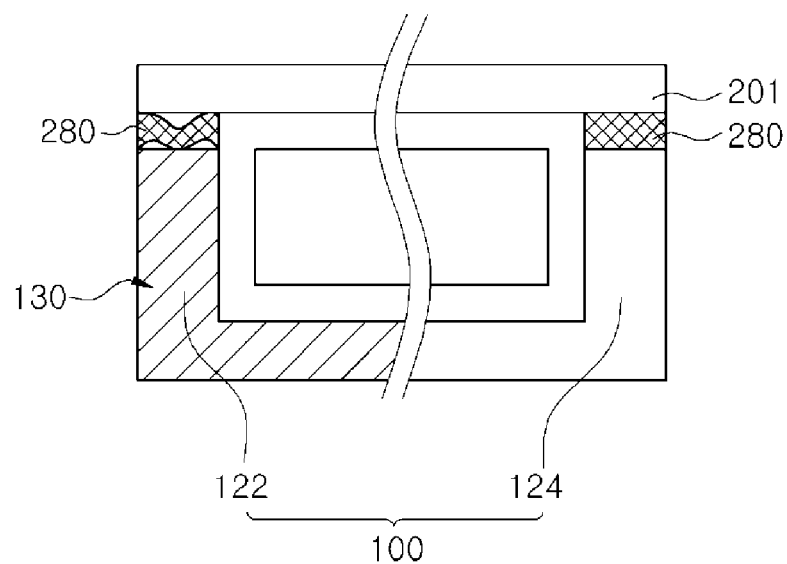
FIG. 5 is a cross-sectional view illustrating a separation principle of a supporting frame and a display panel according to the second embodiment of the present disclosure.

FIG. 5 is a cross-sectional view illustrating a separation principle of a supporting frame and a display panel according to the second embodiment of the present disclosure.

In FIG. 5, a shape of a top surface of the second side surface 124 is maintained during a heating step, and an attachment force between the display panel 201 and the supporting frame 100 is maintained at a position of the second side surface 124.

However, when a heat is applied to the display panel 201 and the supporting frame 100 attached to each other by the adhesive 280, an unevenness is generated on the top surface of the thermal shape changing part 130 and the contact area of the adhesive 280 and the display panel 201 is reduced. As a result, the attachment force between the display panel 201 and the supporting frame 100 is reduced at a position of the thermal shape changing part 130.

Accordingly, the display panel 201 may be easily and effectively separated from the supporting frame 100. Since the adhesive 280 is peeled off completely from an interface with the display panel 201, a cleaning process for the display panel 201 is not required, and deterioration of the display panel 201 due to a residue of the adhesive is prevented or minimized.

Figure 6:
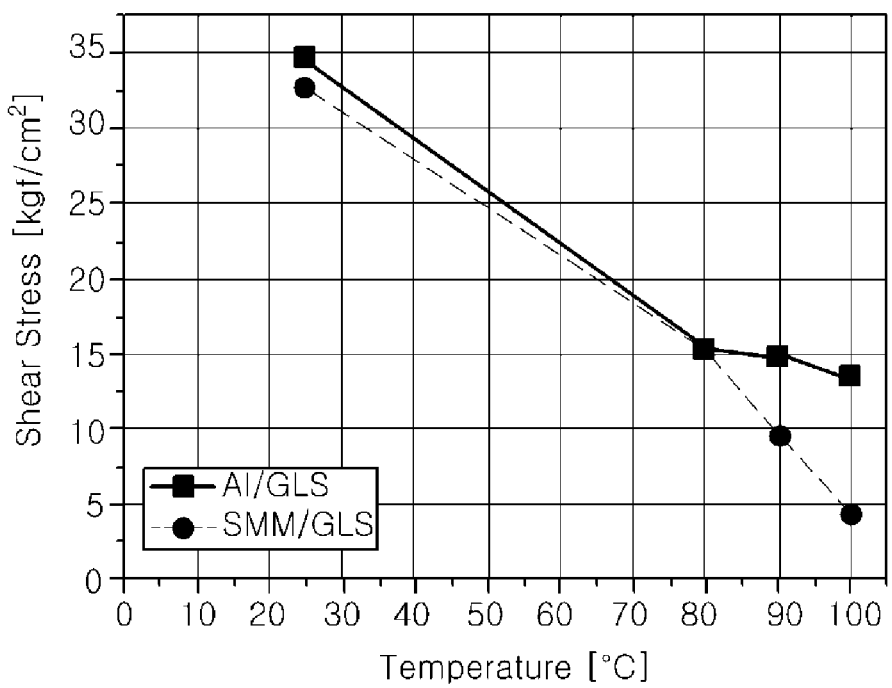
FIG. 6 is a graph illustrating a change of an attachment force of a supporting frame and a display panel according to the second embodiment of the present disclosure.

FIG. 6 is a graph illustrating a change of an attachment force of a supporting frame and a display panel according to the second embodiment of the present disclosure.

(1) Comparison Example

In a state where a supporting frame of aluminum (Al) and a glass substrate GLS are attached to each other by an adhesive, an attachment force according to a change of a temperature was measured.

(2) Embodiment Example

In a state where a thermal shape changing part of a shape memory material SSM of a supporting frame and a glass substrate GLS are attached to each other by an adhesive, an attachment force according to a change of a temperature was measured.

The adhesive including an acrylate compound (60 wt % to 70 wt %), an urethane compound (25 wt % to 40 wt %), a titanium black (3 wt % to 5 wt %) and a photo-base generator (1 wt % to 10 wt %) was used.

The attachment forces of the comparison example and the embodiment example were measured and shown in TABLE 1 and FIG. 6.

TABLE 1

| | Temperature [° C.] | Shear Stress [kgf/cm$^2$] | P/I |
|---|---|---|---|
| Comparison Example (Al/GLS) | 25 | 34.7 | C/F |
| | 80 | 15.1 | C/F |
| | 90 | 14.8 | Random |
| | 100 | 13.4 | Random |
| Embodiment Example (SMM/GLS) | 25 | 32.7 | C/F |
| | 80 | 15.2 | C/F |
| | 90 | 9.4 | Glass |
| | 100 | 4.3 | Glass |

In TABLE 1 and FIG. 6, the attachment force of the comparison example is substantially the same as the attachment force of the embodiment example in the temperature of about 20° C. to about 80° C. However, the attachment force of the embodiment example according to the present disclosure is smaller than the attachment force of the comparison example in a temperature equal to or higher than about 90° C. Specifically, the attachment force of the embodiment example has a relatively small attachment force in a temperature of about 100° C.

As a result, since the embodiment example of the present disclosure has a peeling interface PI on the glass substrate in a temperature of about 90° C. to about 100° C., the rework process may be easily performed for the embodiment example.

Figure 7A:
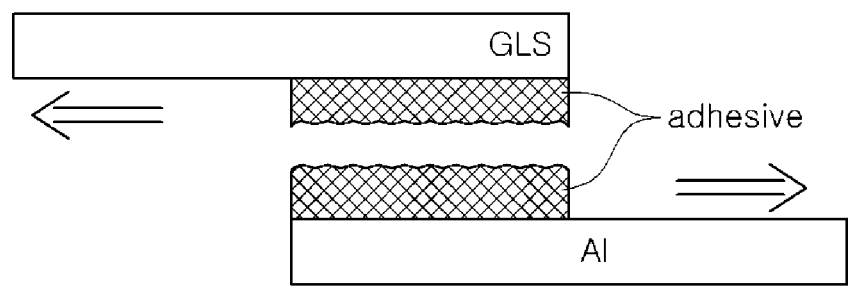
FIGS. 7A to 7C are cross-sectional views illustrating a peeling property of an adhesive used for a display device according to the second embodiment of the present disclosure.
Figure 7B:
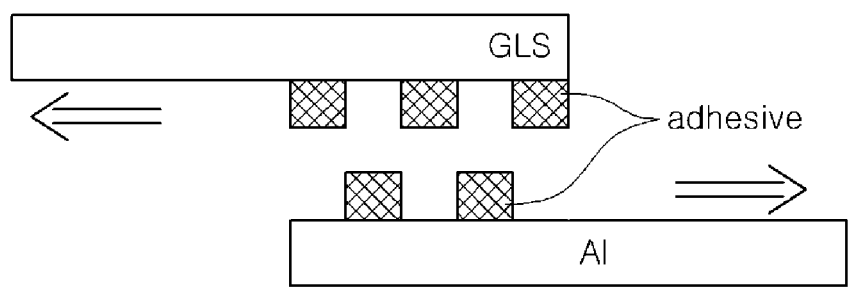
Figure 7C:
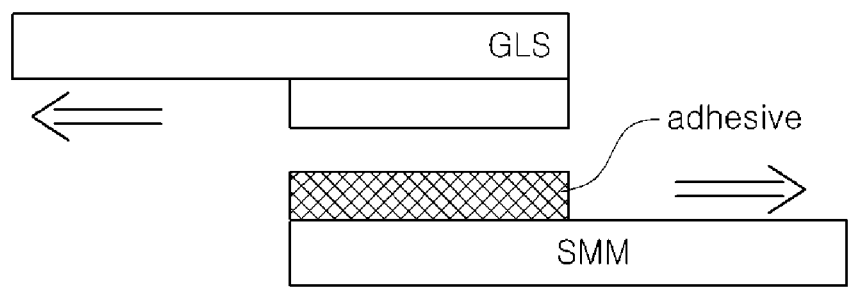

FIGS. 7A to 7C are cross-sectional views illustrating a peeling property of an adhesive used for a display device according to the second embodiment of the present disclosure.

According to a result of a peeling test, an attachment force may be classified into a cohesive failure CF of FIG. 7A where a peeling is generated in the adhesive, a random failure of FIG. 7B where the adhesive randomly remains in a glass substrate GLS and an aluminum substrate Al, and an adhesive failure AF of FIG. 7C where a peeling of the adhesive is generated at an interface of a glass substrate GLS and the adhesive or at an interface of a shape memory substrate SMI and the adhesive.

In the comparison example, the cohesive failure or the random failure occurs within all temperature range. In the embodiment example of the present disclosure, the adhesive failure occurs in a temperature of about 90° C. to about 100° C., and the peeling interface PI is the glass substrate GLS. As a result, the rework process may be easily performed for the embodiment example.

When all of the four side surfaces of the supporting frame 100 are formed of the shape memory material, the peeling property of the adhesive 280 may be not greatly improved. Instead, a cost of the supporting frame 100 may increase and a mechanical property may be reduced.

Even when the thermal shape changing part 130 of the shape memory material is formed in a portion of the side surfaces of the supporting frame 100, the peeling of the adhesive 280 sufficiently occurs with a point where the attachment force is reduced as a starting point. As a result, the peeling process for the supporting frame 100 where a portion of the four side surfaces is formed of the shape memory material is improved as compared with the supporting frame 100 where all of the four side surfaces are formed of the shape memory material.

Since the shape memory material has a higher cost and a poor mechanical property as compared with a material, for example stainless steel (SUS), for the supporting frame 100, the supporting frame 100 where all of the four side surfaces are formed of the shape memory material has disadvantages in the cost and the mechanical property.

As a result, the rework property of the display device 300 is improved with increase of the cost and reduction of the mechanical property of the supporting frame 100 minimized by replacing a portion of the side surfaces of the supporting frame 100 with the thermal shape changing part 130 of the shape memory material.

Figure 8:
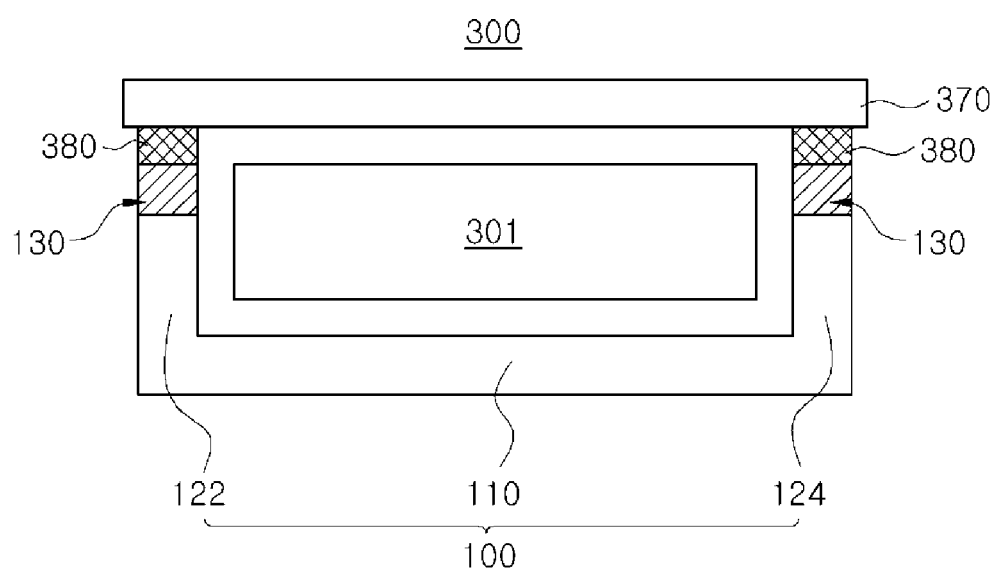
FIG. 8 is a cross-sectional view showing a display device according to a third embodiment of the present disclosure.
Figure 9:
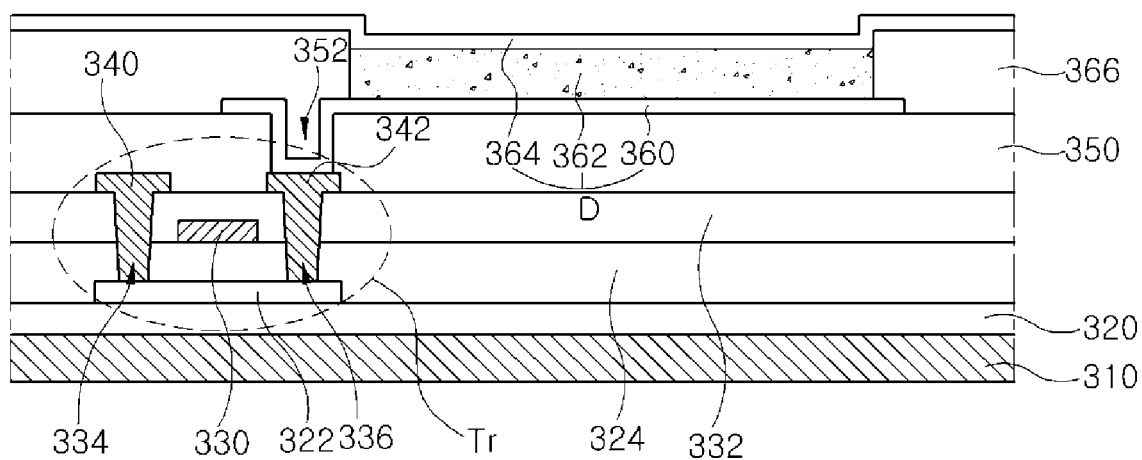
FIG. 9 is a cross-sectional view showing a display panel of a display device according to the third embodiment of the present disclosure.

FIG. 8 is a cross-sectional view showing a display device according to a third embodiment of the present disclosure, and FIG. 9 is a cross-sectional view showing a display panel of a display device according to the third embodiment of the present disclosure.

In FIG. 8, a display device 300 according to a third embodiment of the present disclosure includes a display panel 301, a cover window covering a front surface of the display panel 301, a supporting frame 100 covering a rear surface and a side surface of the display panel 301 and supporting the cover window 370, and an adhesive 380 attaching the supporting frame 100 and the cover window 370.

The display panel 201 includes first and second substrates 210 and 250 facing each other and a liquid crystal layer between the first and second substrates 210 and 250, and the backlight unit 201 includes a light source. The display pane 201 of the second embodiment is a liquid crystal panel, and the display device 200 of the second embodiment is a liquid crystal display (LCD) device.

In FIG. 9, the display panel 301 includes a substrate 310, a thin film transistor (TFT) Tr on the substrate 310 and a light emitting diode D connected to the TFT Tr over the substrate 310. In the third embodiment of the present disclosure, the display panel 301 is a light emitting diode panel, and the display device 300 is a light emitting diode display device. Alternatively, the display panel 301 may be a liquid crystal panel.

A buffer layer 320 is formed on the substrate 310, and the TFT Tr is formed on the buffer layer 320. The buffer layer 320 may be omitted in another embodiment.

A semiconductor layer 322 is formed on the buffer layer 320. The semiconductor layer 322 may include one of an oxide semiconductor material and polycrystalline silicon. When the semiconductor layer 322 includes an oxide semiconductor material, a light shielding pattern may be formed under the semiconductor layer 322. The light shielding layer prevents a light from entering the semiconductor layer 322 and prevents deterioration of the semiconductor layer 322 due to a light. When the semiconductor layer 322 includes polycrystalline silicon, both sides of the semiconductor layer 322 may be doped with an impurity.

A gate insulating layer 324 of an insulating material is formed on the semiconductor layer 322. The gate insulating layer 324 may include an inorganic insulating material such as silicon oxide and silicon nitride. A gate electrode 330 of a conductive material such as a metal is formed on the gate insulating layer 324 corresponding to a central portion of the semiconductor layer 322. Although the gate insulating layer 324 is formed on a whole surface of the substrate 310 in FIG. 9, the gate insulating layer 324 may be formed to have the same shape as the gate electrode 330.

An interlayer insulating layer 332 of an insulating material is formed on the gate electrode 330. The interlayer insulating layer 332 may include an inorganic insulating material such as silicon oxide and silicon nitride or an organic insulating material such as benzocyclobutene and photoacryl. The interlayer insulating layer 332 has first and second contact holes 334 and 336 exposing both sides of the semiconductor layer 322. The first and second contact holes 334 and 336 are disposed at both sides of the gate electrode 330 to be spaced apart from the gate electrode 330.

The first and second contact holes 334 and 336 are formed in the gate insulating layer 324. In another embodiment where the gate insulating layer 324 is formed to have the same shape as the gate electrode 330, the first and second contact holes 334 and 336 may be formed only in the interlayer insulating layer 332.

A source electrode 340 and a drain electrode 342 of a conductive material such as a metal are formed on the interlayer insulating layer 332. The source electrode 340 and the drain electrode 342 are spaced apart from each other with the gate electrode 330 as a center and are connected to both sides of the semiconductor layer 322 through the first and second contact holes 334 and 336, respectively.

The semiconductor layer 322, the gate electrode 330, the source electrode 340 and the drain electrode 342 constitute the thin film transistor (TFT) Tr, and the TFT Tr functions as a driving element. The TFT Tr has a coplanar type where the gate electrode 330, the source electrode 342 and the drain electrode 344 are disposed over the semiconductor layer 320. In another embodiment, the TFT Tr may have an inverted staggered type where the gate electrode is disposed under the semiconductor layer and the source electrode and the drain electrode are disposed over the semiconductor layer, and the semiconductor layer may include amorphous silicon.

Although not shown, a gate line and a data line cross each other to define a pixel region, and a switching element connected to the gate line and the data line is formed in the pixel region. The switching element is connected to the TFT Tr of the diving element. In addition, a power line and a storage capacitor are formed on the substrate 310. The power line is parallel to and spaced apart from one of the gate line and the data line. A voltage of the gate electrode 330 of the TFT Tr is kept constant for one frame due to the storage capacitor.

A passivation layer 350 is formed on the TFT Tr. The passivation layer 350 has a drain contact hole 352 exposing the drain electrode 342. A first electrode 360 is formed on the passivation layer 352 in each pixel region. The first electrode 360 is connected to the drain electrode 342 through the drain contact hole 352. The first electrode 360 may be an anode and may include a conductive material having a relatively high work function. For example, the first electrode 360 may include a transparent conductive material such as indium tin oxide (ITO) and indium zinc oxide (IZO).

A bank layer 366 is formed on the passivation layer 350 to cover an edge portion of the first electrode 360. The bank layer 366 exposes a central portion of the first electrode 360 corresponding to the pixel region.

An emitting layer 362 is formed on the first electrode 360. The emitting layer 362 may have a single-layered structure including an emitting material layer of an emitting material. Alternatively, the emitting layer 362 may have a multi-layered structure including a hole injecting layer, a hole transporting layer, an emitting material layer, an electron transporting layer and an electron injecting layer sequentially on the first electrode 360 for improving an emission efficiency. The emitting material layer may include an inorganic emitting material such as a quantum dot or an organic emitting material.

A second electrode 364 is formed on the emitting layer 362. The second electrode 364 may be disposed on an entire surface of the substrate 310 and may be a cathode of a conductive material having a relatively low work function. For example, the second electrode 364 may include one of aluminum (Al), magnesium (Mg) and aluminum magnesium (AlMg) Alloy. The first electrode 360, the emitting layer 362 and the second electrode 364 may constitute a light emitting diode D.

Although not shown, an encapsulation film may be formed on the second electrode 364 for preventing penetration of an external moisture into the light emitting diode D. Although the encapsulation film may include a first inorganic insulating layer, an organic insulating layer and a second inorganic insulating layer, the structure of the encapsulation film is not limited to this set forth. In addition, a polarizing plate may be formed on the encapsulation film for reducing a reflection of an external light. For example, the polarizing plate may include a circular polarizing plate.

In FIG. 8, the cover window 370 is disposed over a front surface (i.e., a display surface) of the display panel 301 and protects the display panel 301. For example, the cover window 301 may include a tempered glass. Alternatively, the cover window 301 may include a high hardness plastic.

The supporting frame 100 includes a bottom surface 110 and first and second side surfaces 122 and 124. The bottom surface 110 covers a rear surface of the backlight unit 301. The first and second side surfaces 122 and 124 cover side surfaces of the display panel 301 and support the cover window 370.

A portion of the first side surface 122 may constitute the thermal shape changing part 130 of a shape memory material. For example, the thermal shape changing part 130 may be disposed at upper portions of the four corners between the first and third side surfaces 122 and 126, between the first and fourth side surfaces 122 and 128, between the second and third side surfaces 124 and 126, and between the second and fourth side surfaces 124 and 128 as shown in FIG. 2D.

An adhesive 380 is disposed between the cover window 370 and each of the first and second side surfaces 122 and 124 and the thermal shape changing part 130 to attach the cover window 370 to the supporting frame 100. The adhesive 380 is formed on the third and fourth side surfaces 126 and 128.

The adhesive 380 may include an elastic resin. The adhesive 380 may include at least one of an acrylic compound, an urethane compound, a silicon compound and an epoxy compound. In addition, the adhesive 380 may further include a black particle for preventing a light leakage.

As shown in FIG. 5, when a heat is applied to the display device 300, an unevenness is generated on the top surface of the thermal shape changing part 130 and the contact area of the adhesive 380 and the cover window 370 is reduced. As a result, the attachment force between the cover window 370 and the supporting frame 100 is reduced at a position of the thermal shape changing part 130.

Accordingly, the cover window 370 may be easily separated from the supporting frame 100. Since the adhesive 380 is peeled from an interface with the cover window 370, a cleaning process for the cover window 370 is not required, and deterioration of the cover window 370 due to a residue of the adhesive is prevented.

As a result, the rework property of the display device 300 is improved with increase of the cost and reduction of the mechanical property of the supporting frame 100 minimized by replacing a portion of the side surfaces of the supporting frame 100 with the thermal shape changing part 130 of the shape memory material.

FIGS. 10A to 10G are perspective views showing examples of a supporting frame according to a fourth embodiment of the present disclosure.

Figure 10A:
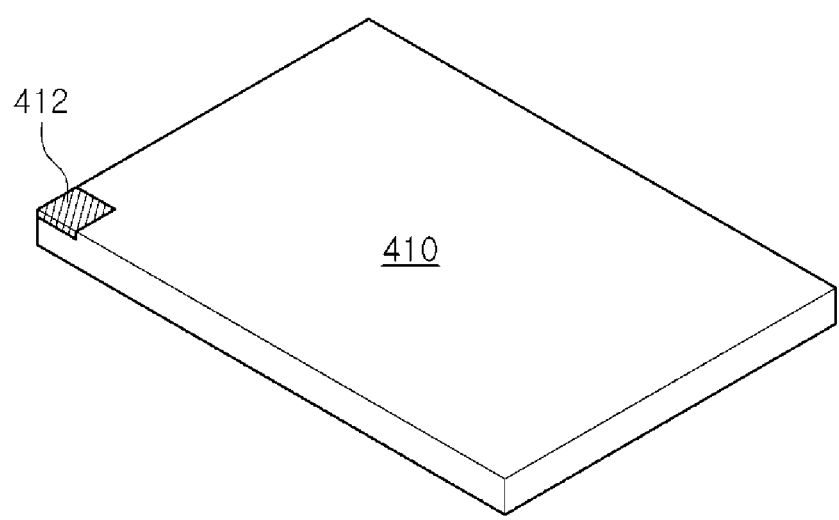
FIGS. 10A to 10G are perspective views showing a supporting frame according to a fourth embodiment of the present disclosure.

In FIG. 10A, a supporting frame 400 according to the fourth embodiment of the present disclosure includes a horizontal surface 410 and a thermal shape changing part 412 of a shape memory material disposed at an edge portion of the horizontal surface 410.

The horizontal surface 410 may include one of a metal such as aluminum (Al), stainless steel (SUS) and electro galvanized iron (EGI), a plastic such as polycarbonate (PC) and a carbon fiber reinforced plastic, and a glass.

The thermal shape changing part 412 may include a shape memory material such as a nickel titanium (Ni—Ti) alloy, a copper zinc nickel (Cu—Zn—Ni) alloy, a copper aluminum nickel (Cu—Al—Ni) alloy, a silver nickel (Ag—Ni) alloy and a gold cadmium (Au—Cd) alloy. As a result, a portion of the horizontal surface of the supporting frame 400 may include a shape memory material.

Figure 10B:
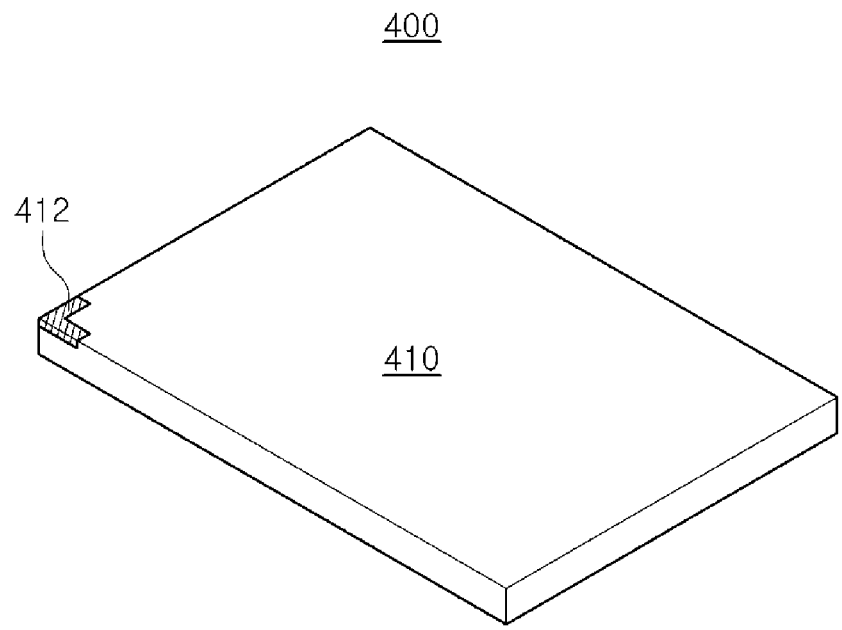
Figure 10C:
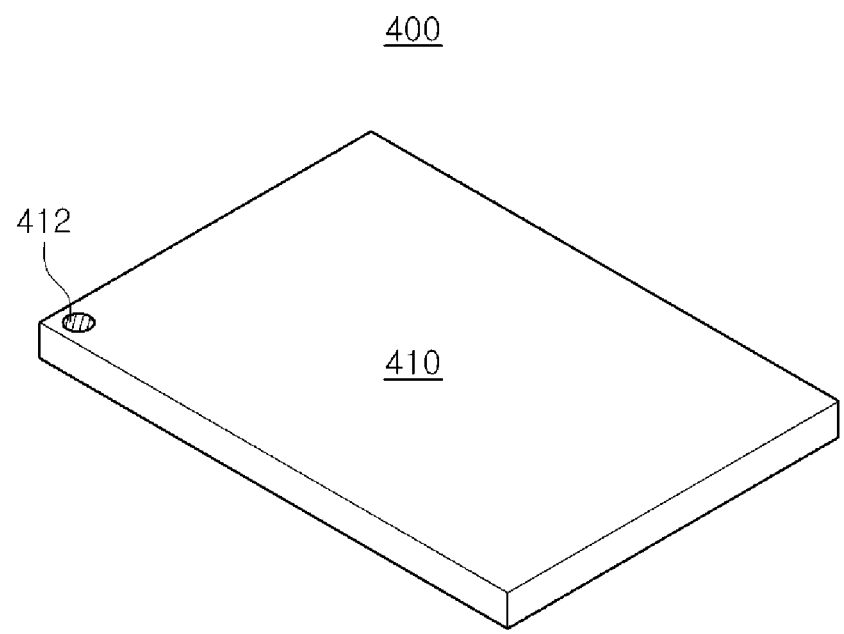
Figure 10D:
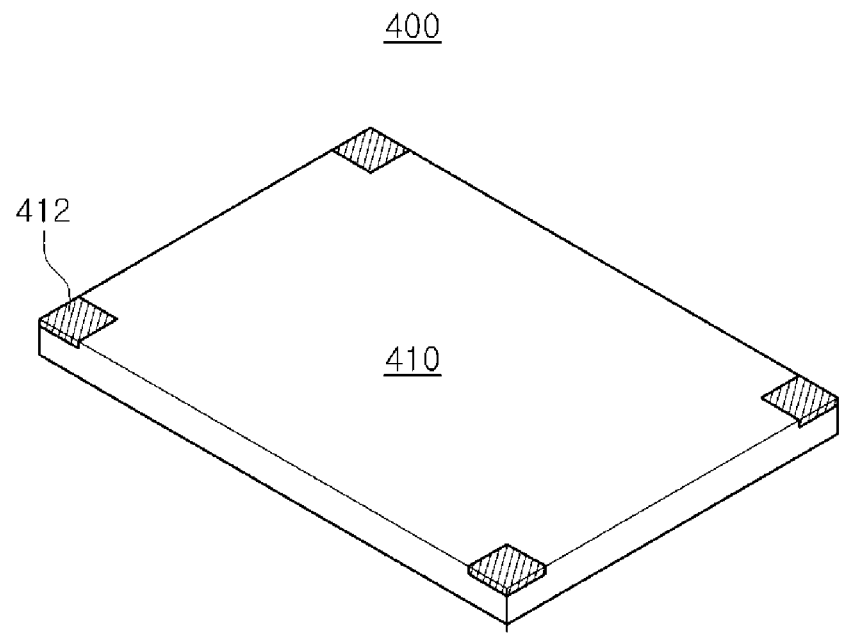
Figure 10E:
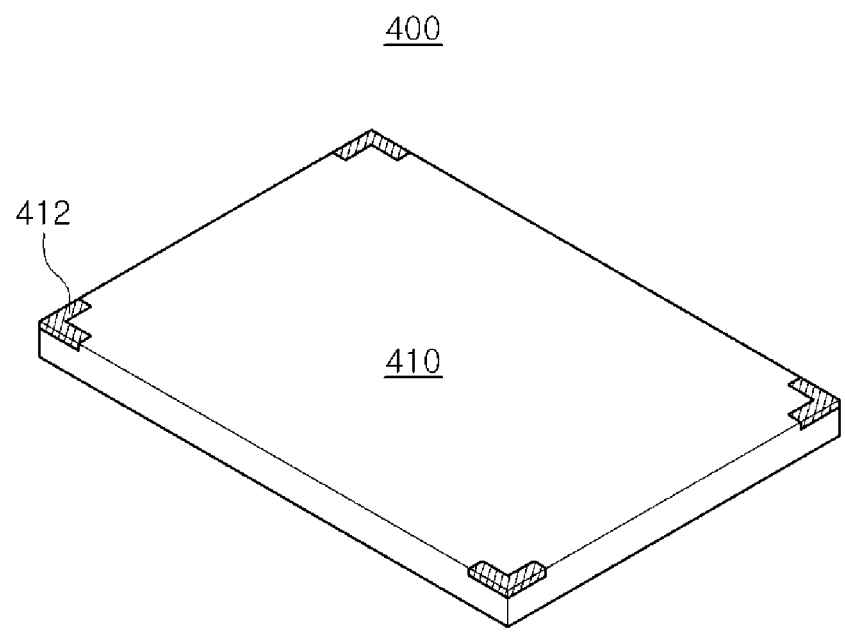
Figure 10F:
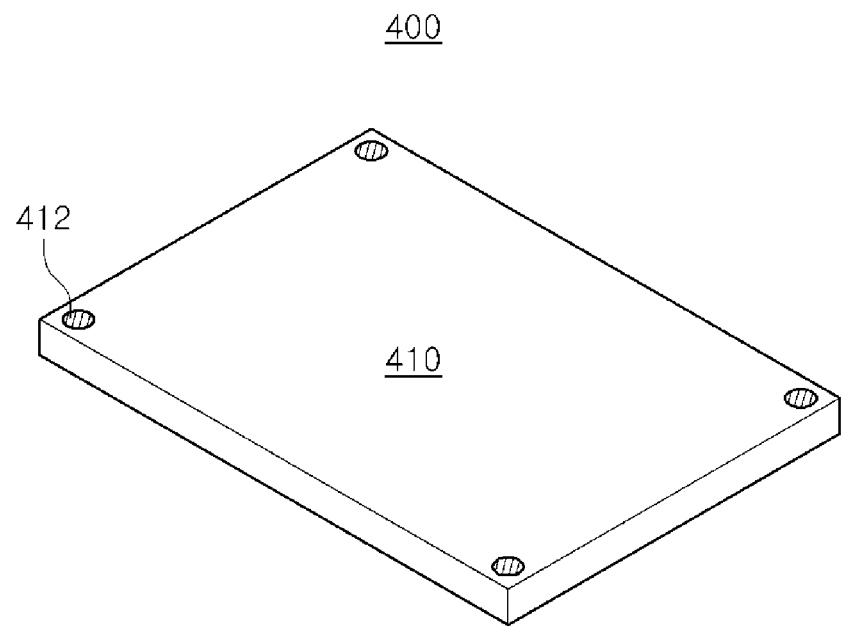
Figure 10G:
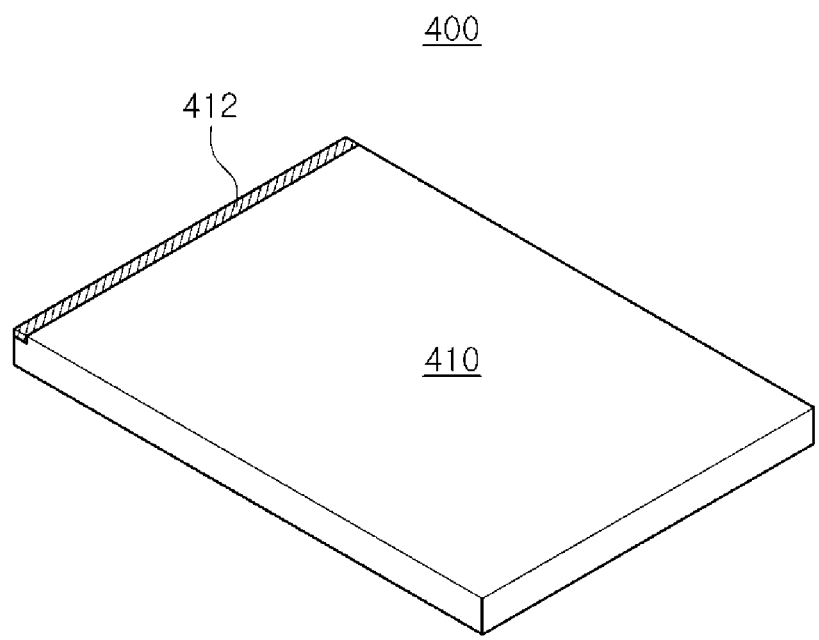

The thermal shape changing part 412 may have an "L" shape as shown in FIG. 10B and may have a circular shape as shown in FIG. 10C. In addition or in the alternative, the thermal shape changing part 412 may be formed at four corners of the horizontal surface 410 as shown in FIGS. 10D to 10F. In another embodiment, the thermal shape changing part 412 may be formed at two or three of the four corners of the horizontal surface 410. Further, the thermal shape changing part 412 may be formed along a side of the horizontal surface 410 as shown in FIG. 10G.

In FIGS. 10A to 10G, the thermal shape changing part 412 is formed in an upper portion of the horizontal surface 410 to have a relatively small thickness. In another embodiment, the thermal shape changing part 412 may have the same thickness as the horizontal surface 410. According to the present disclosure, one or more features in each of the various examples of the supporting frame discussed herein can be applied to or combined with any other example of the supporting frame discussed herein.

The thermal shape changing part 412 may constitute a flat top surface with the horizontal surface 410. As a result, an adhesive may be formed to have a uniform thickness.

The supporting frame 400 contacts the adhesive and the thermal shape changing part 412 of a shape memory material is formed at a portion of the supporting frame 400. As a result, the supporting frame 400 includes the thermal shape changing part 412 at a portion thereof, the supporting frame 400 and the adhesive contact each other with a first contact area, and the thermal shape changing part 412 and the adhesive contact each other with a second contact area smaller than the first contact area.

Figure 11:
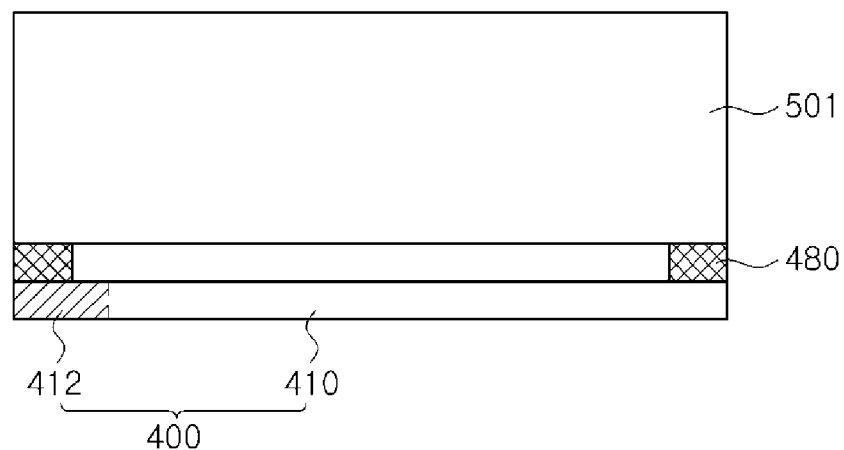
FIG. 11 is a cross-sectional view showing a display device according to a fifth embodiment of the present disclosure.

FIG. 11 is a cross-sectional view showing a display device according to a fifth embodiment of the present disclosure.

In FIG. 11, a display device 500 according to the fifth embodiment of the present disclosure includes a display panel 501, a supporting frame 400 covering a rear surface of the display panel 501 and supporting the display panel 501, and an adhesive 480 attaching the supporting frame 400 and the display panel 501. The display panel 501 may include one of a liquid crystal panel 201 (of FIG. 4) and a light emitting diode panel 301 (of FIG. 9).

The supporting frame 400 includes a horizontal surface 410 and a thermal shape changing part 412 disposed at an edge portion of the horizontal surface 410. For example, the thermal shape changing part 412 may be disposed at one corner of the horizontal surface 410 as shown in FIG. 10A.

An adhesive 480 is disposed between the display panel 501 and each of the edge portion of the horizontal surface 410 and the thermal shape changing part 412 to attach the display panel 501 to the supporting frame 400.

Since the thermal shape changing part 412 is formed at a portion of the supporting frame 400, a contact area of the thermal shape changing part 412 and the adhesive 480 is smaller than a contact area of the adhesive 480 and the supporting frame 400. Although not shown, a radiating member may be disposed between a central portion of the display panel 501 and the supporting frame 400.

In another embodiment, the adhesive 480 may be disposed in a whole of the supporting frame 400.

The adhesive 480 may include an elastic resin. The adhesive 480 may include at least one of an acrylic compound, an urethane compound, a silicon compound and an epoxy compound. In addition, the adhesive 480 may further include a black particle for preventing a light leakage.

As illustrated with respect to FIG. 5, when a heat is applied to the display device 500, an unevenness is generated on the top surface of the thermal shape changing part 412 and the contact area of the adhesive 480 and the display panel 501 is reduced. As a result, the attachment force between the display panel 501 and the supporting frame 400 is reduced at a position of the thermal shape changing part 412.

Accordingly, the display panel 501 may be easily separated from the supporting frame 400. Since the adhesive 480 is peeled from an interface with the display panel 501, a cleaning process for the display panel 501 is not required, and deterioration of the display panel 501 due to a residue of the adhesive is prevented.

As a result, the rework property of the display device 500 is improved with increase of the cost and reduction of the mechanical property of the supporting frame 400 minimized by replacing a portion of the side surface of the supporting frame 400 with the thermal shape changing part 412 of the shape memory material.

Consequently, since a portion of the supporting fame is formed of the shape memory material and the heat is added to the supporting frame and the other elements attached to each other by the adhesive, deterioration of the peeling process of the adhesive is prevented.

According to the present disclosure, since the contact area of the adhesive and the other elements on the thermal shape changing part of the shape memory material is reduced and the attachment force is reduced due to the heating process, the adhesive remains only on the supporting frame after the peeling process.

Since no residue of the adhesive remains after the peeling process, the fast rework process is obtained by omitting the cleaning process. In addition, since deterioration of the elements due to the cleaning process is prevented, a production efficiency of the display device is improved.

Since the shape memory material having disadvantages in a cost and a mechanical property such as rigidity is partially formed, the fabrication cost of the supporting frame is reduced and the mechanical property is improved.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A display device comprising:
a display panel;
a cover window covering the entire display panel;
a backlight unit under the display panel to supply light to the display panel:
a supporting frame including a horizontal bottom surface and vertical side surfaces, the vertical side surfaces protruding from the horizontal bottom surface and supporting the cover window, each of the vertical side surfaces including an upper surface located higher than an uppermost surface of the horizontal bottom surface, the supporting frame receiving the backlight unit,
a thermal shape changing part disposed in a top surface of at least one of the vertical side surfaces of the supporting frame, the thermal shape changing part including a shape memory material extending from an uppermost surface of the supporting frame to a lowermost surface of the support frame; and
an adhesive between the cover window and the vertical side surfaces of the supporting frame, the adhesive contacting a lower surface of the display panel or a lower surface of the cover window and the adhesive contacting the upper surface of at least one of the vertical side surfaces,
wherein the adhesive includes black particles,
wherein the thermal shape changing part is configured to have an uneven top surface
when heat is applied thereto and the adhesive is disposed on the uneven top surface, the uneven top surface reducing a contact area between the thermal shape changing part and the adhesive by forming a cavity between the adhesive and the thermal shape changing part,
wherein the thermal shape changing part is formed integrally with the supporting frame,
wherein an uppermost surface of the thermal shape change part is flush with an uppermost surface of the supporting frame,
wherein the thermal shape changing part is spaced apart from the backlight unit and exposed outside of the display device
wherein the thermal shape changing part forms at least part of an outermost edge surface of the supporting frame, and
wherein the thermal shape changing part is configured to deform differently than the at least one of the vertical side surfaces of the supporting frame in response to heat.

2. The supporting frame of claim 1, wherein the vertical side surfaces of the supporting frame include first, second, third and fourth side surfaces protruding from the horizontal bottom surface.

3. The display device of claim 1, wherein the cover window covers the supporting frame.

4. The display device of claim 1, wherein the thermal shape changing part is disposed in at least one of the vertical side surfaces of the supporting frame.

5. The display device of claim 1, wherein the thermal shape changing part is at least a part of at least one of the vertical side surfaces of the supporting frame.

6. The display device of claim 1, wherein the thermal shape changing part is disposed in at least one corner of at least one of the vertical side surfaces of the supporting frame.

7. The display device of claim 1, wherein the thermal shape changing part is at least a part of at least one of the vertical side surfaces of the supporting frame.

8. The supporting frame of claim 1, wherein the at least one vertical side surface of the supporting frame and the thermal shape changing part constitute a flat top surface of the supporting frame.

9. The display device of claim 1, wherein the backlight unit is surrounded by the horizontal bottom surface and the vertical side surfaces of the supporting frame.

10. The display device of claim 1, wherein the thermal shape changing part fastens two perpendicular sides of the supporting frame together.

* * * * *